(12) United States Patent
Momoi

(10) Patent No.: US 10,705,381 B2
(45) Date of Patent: Jul. 7, 2020

(54) LIGHT-EMITTING DEVICE, PLANAR LIGHT SOURCE DEVICE AND DISPLAY DEVICE

(71) Applicant: Enplas Corporation, Saitama (JP)

(72) Inventor: Takuro Momoi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/488,951

(22) PCT Filed: Feb. 26, 2018

(86) PCT No.: PCT/JP2018/006895
§ 371 (c)(1),
(2) Date: Aug. 27, 2019

(87) PCT Pub. No.: WO2018/155676
PCT Pub. Date: Aug. 30, 2018

(65) Prior Publication Data
US 2020/0012153 A1   Jan. 9, 2020

(30) Foreign Application Priority Data
Feb. 27, 2017 (JP) ................. 2017-034740

(51) Int. Cl.
*G02F 1/13357* (2006.01)

(52) U.S. Cl.
CPC .. *G02F 1/133606* (2013.01); *G02F 1/133603* (2013.01); *G02F 2001/133607* (2013.01)

(58) Field of Classification Search
CPC ......... G02F 1/133606; G02F 1/133603; G02F 2001/133607; F21V 5/00; F21S 2/00
See application file for complete search history.

(56) References Cited

U.S. PATENT DOCUMENTS 10,222,651 B2   3/2019   Fujii
2010/0135028 A1   6/2010   Kokubo
(Continued)

FOREIGN PATENT DOCUMENTS

CN   104583667 A   4/2015
JP   2009-043628 A   2/2009
(Continued)

OTHER PUBLICATIONS

International Search Report from International Application No. PCT/JP2018/006895 dated Apr. 24, 2018.

*Primary Examiner* — Evan P Dzierzynski
(74) *Attorney, Agent, or Firm* — Brundidge & Stanger, P.C.

(57) ABSTRACT

This light-emitting device has a light-emitting element and a light flux control member. The light flux control member has an entry surface, a light control surface, a back surface, and a ring-shaped groove. The light control surface includes a first transmission portion, a total reflection portion, and a second transmission portion. The ring-shaped groove includes a first inner surface and a second inner surface. A second light beam, which is a light beam that is part of the light beam emitted from the light-emitting center of the light-emitting element, enters the interior of the light flux control member at the entry surface, is totally reflected at the total reflection portion, then internally reflected at the second inner surface, and exits from the second transmission portion to the exterior of the light flux control member.

13 Claims, 14 Drawing Sheets

(56) References Cited

U.S. PATENT DOCUMENTS

| | | | |
|---|---|---|---|
| 2014/0009944 A1* | 1/2014 | Fukuda | F21V 5/046 362/311.08 |
| 2015/0260371 A1 | 9/2015 | Takatori et al. | |
| 2015/0323729 A1* | 11/2015 | Takatori | G02F 1/133603 362/606 |
| 2015/0354786 A1 | 12/2015 | Ji et al. | |
| 2017/0212386 A1* | 7/2017 | Fujii | G02F 1/133606 |
| 2018/0188608 A1 | 7/2018 | Fujii et al. | |

FOREIGN PATENT DOCUMENTS

| | | |
|---|---|---|
| JP | 2015-233124 A | 12/2015 |
| JP | 2017017001 A | 1/2017 |

* cited by examiner

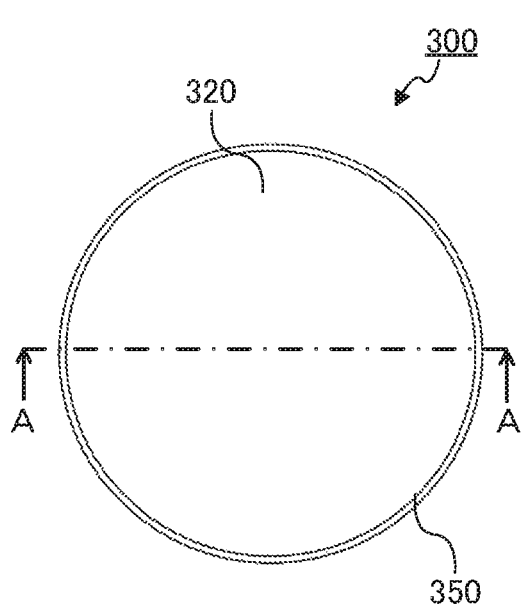
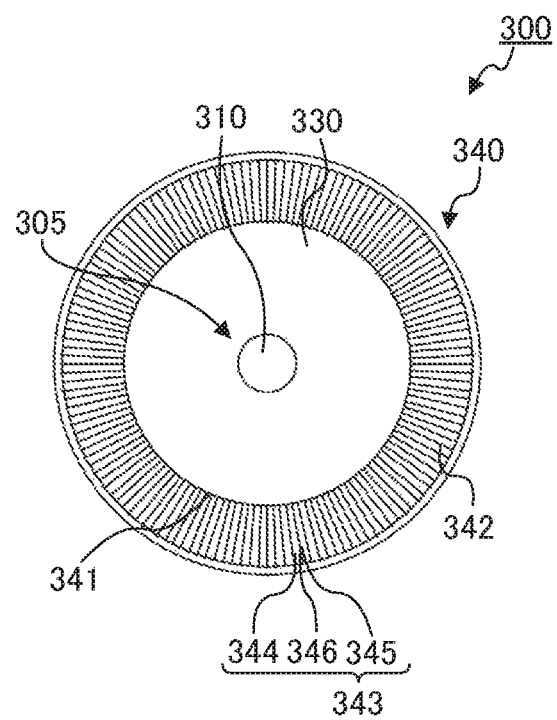
FIG. 5A
FIG. 5B
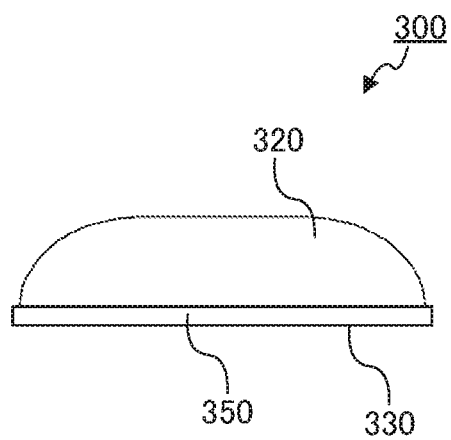
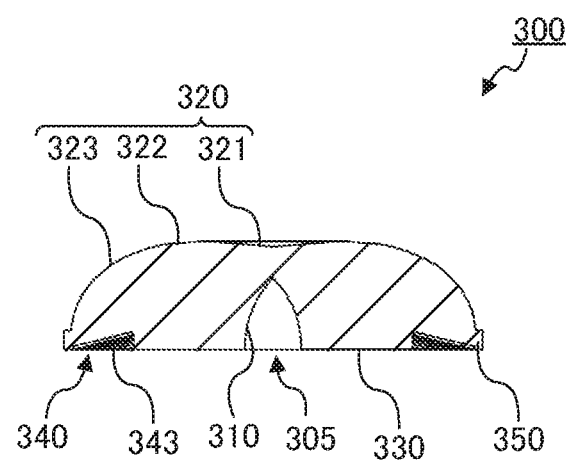
FIG. 5C
FIG. 5D

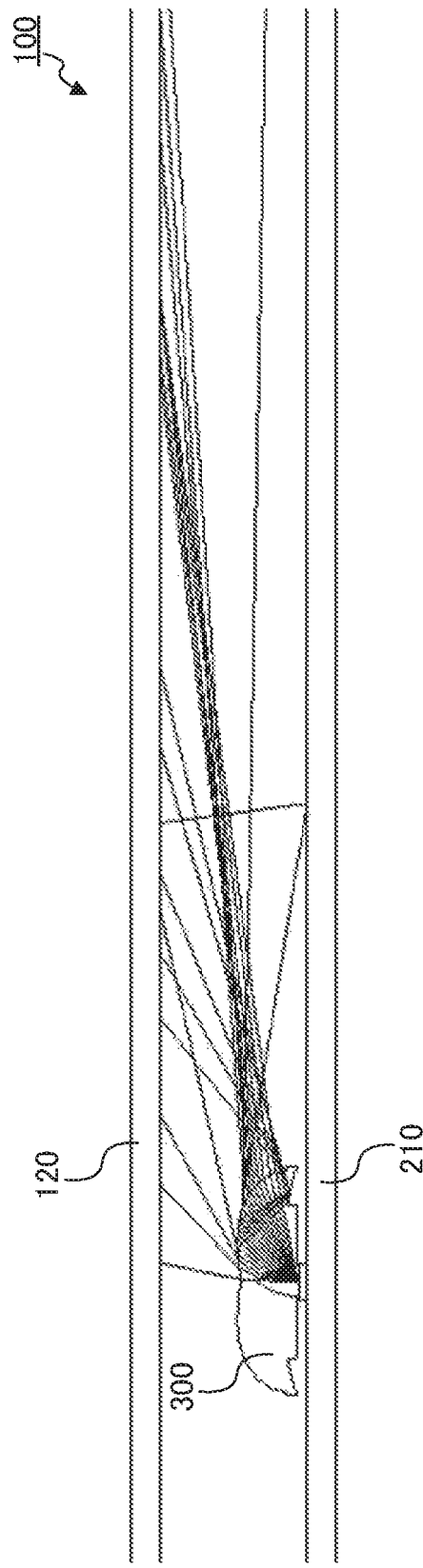
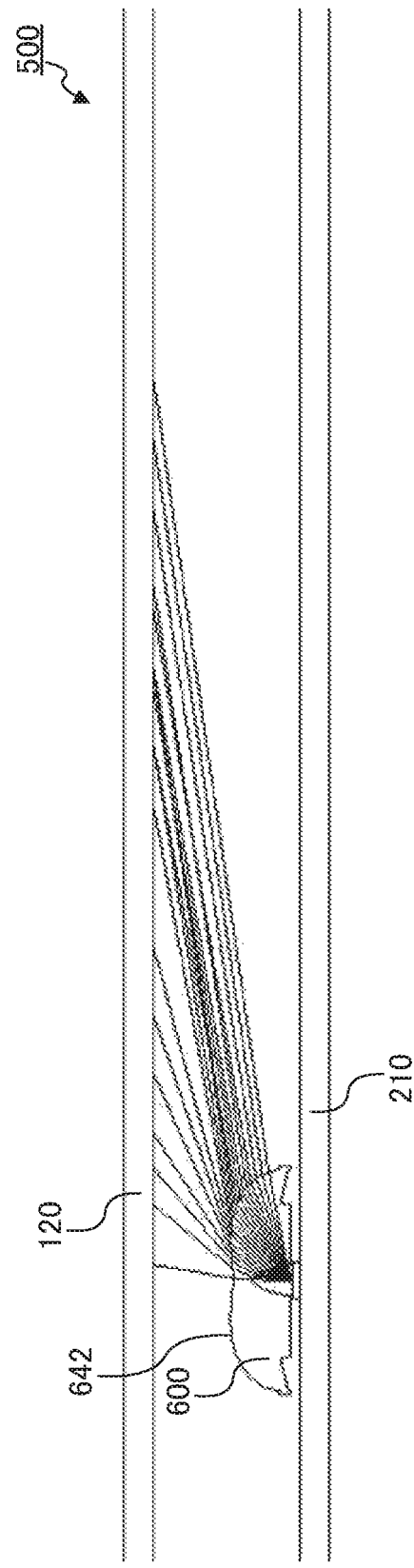
FIG. 6A
FIG. 6B

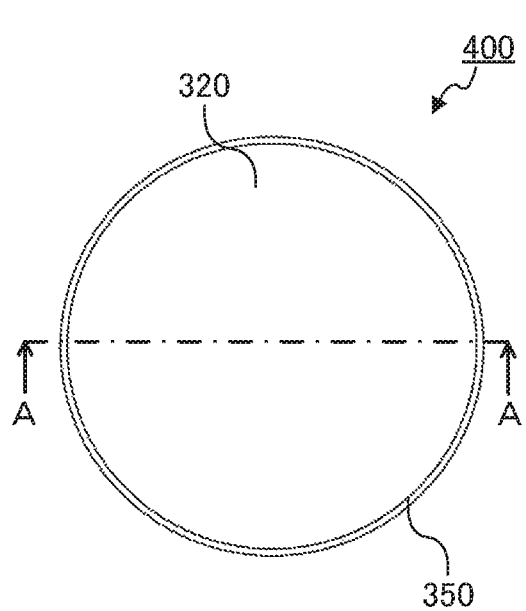
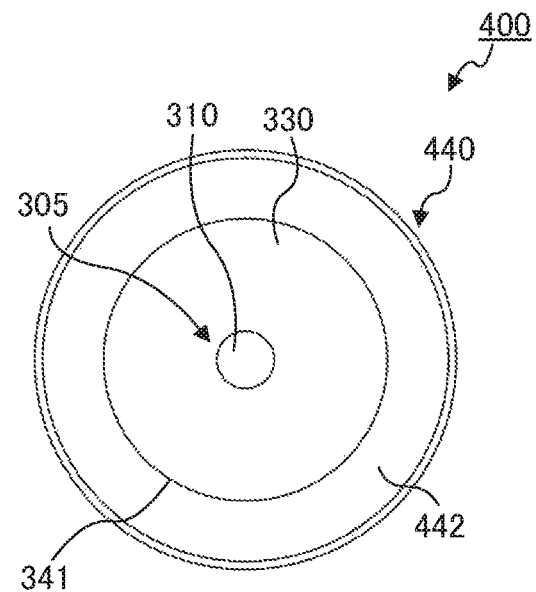
FIG. 14A
FIG. 14B
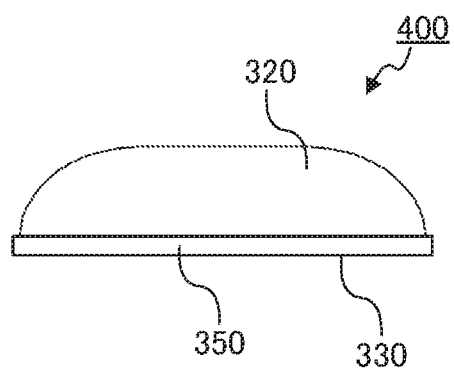
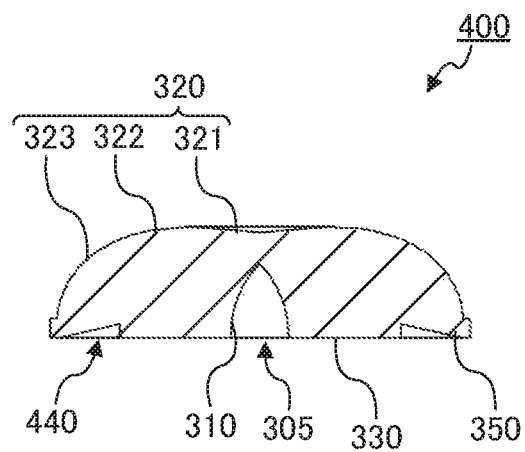
FIG. 14C
FIG. 14D

LIGHT-EMITTING DEVICE, PLANAR LIGHT SOURCE DEVICE AND DISPLAY DEVICE

TECHNICAL FIELD

The present invention relates to a light emitting device, a surface light source device and a display device.

BACKGROUND ART

In recent years, from a view point of energy saving and downsizing, light emitting diodes (hereinafter also referred to as "LEDs") are used as a light source for illumination. Light emitting devices using a combination of an LED and a light flux controlling member that controls the distribution of light emitted from the LED are used in place of fluorescent lamps and halogen lamps. In addition, a transmission type image display device such as a liquid crystal display device uses light emitting devices disposed in a lattice as a backlight (see, for example, PTL 1).

The light emitting device disclosed in PTL 1 includes a light emitting element and a light flux controlling member. The optical axis of the light emitting element and the central axis of the light flux controlling member are aligned with each other. The light flux controlling member includes a light incidence surface configured to allow light emitted from the light emitting element to enter the light flux controlling member, a light emission surface configured to emit, to the outside of the light flux controlling member, light entered from the light incidence surface, and a bottom surface connecting the light incidence surface and the light emission surface.

The light incidence surface is an inner surface of a recess that opens toward the bottom surface side. In the light emission surface, a center portion intersects the optical axis of the light emitting element and has a smooth protruding shape protruding toward the bottom surface side. In the region outside the center portion, the light emission surface has a smooth protruding shape protruding toward the side opposite to the bottom surface side.

Light emitted from the center of the light emitting surface of the light emitting element enters the light flux controlling member from the light incidence surface while being refracted at the light incidence surface in the direction away from the central axis. The light having entered the light flux controlling member is further refracted at the light emission surface to travel away from the central axis, and is then emitted out of the light flux controlling member. In this manner, in the light emitting device disclosed in PTL 1, light from the light emitting element that has entered the light flux controlling member is actively emitted to the outside.

CITATION LIST

Patent Literature

PTL 1
Japanese Patent Application Laid-Open No. 2009-043628

SUMMARY OF INVENTION

Technical Problem

The light emitting device disclosed in PTL 1 controls the light reaching the light emission surface such that the light is actively emitted. Consequently, in a surface light source device including the light emitting device disclosed in PTL 1, a bright spot may be generated in a region immediately above the light emitting device although light emitted from the light emitting element is refracted by the light incidence surface and the light emission surface of the light flux controlling member. When the thickness and light are reduced in such a surface light source device, the above-mentioned bright spot is emphasized, and luminance unevenness on the illuminated surface may result.

In view of this, an object of the present invention is to provide a light emitting device that can expand light emitted from the light emitting element over a wide range while reducing the light travelling immediately upward in comparison with the conventional light emitting device. In addition, another object of the present invention is to provide a surface light source device and a display device including the light emitting device.

Solution to Problem

A light emitting device according to an embodiment of the present invention includes a light emitting element and a light flux controlling member configured to control a distribution of light emitted from the light emitting element. An optical axis of the light emitting element and a central axis of the light flux controlling member are aligned with each other. The light flux controlling member includes: an incidence surface that is an inner surface of a recess disposed to intersect the central axis and to open toward a rear side, the incidence surface being configured to allow incidence of the light emitted from the light emitting element; a light control surface disposed on a front side to intersect the central axis, the light control surface being configured to control a distribution of light entered from the incidence surface, a rear surface disposed on the rear side to surround an opening edge of the recess; and an annular groove formed in a circular shape in the rear surface to surround the opening edge of the recess. The annular groove includes: a first inner surface disposed on a central axis side; and a second inner surface disposed at a position farther from the central axis than the first inner surface. The light control surface includes: a first transmission part disposed to intersect the central axis, and configured to allow, to pass through the first transmission part, a first light beam emitted from a light emission center of the light emitting element; a total reflection part disposed continuously from the first transmission part to surround the first transmission part, the total reflection part being configured to totally reflect a second light beam toward the second inner surface, the second light beam being a light beam emitted from the light emission center at an angle larger than that of the first light beam with respect to the optical axis; and a second transmission part disposed continuously from the total reflection part to surround the total reflection part, the second transmission part being configured to allow, to pass through the second transmission part, a third light beam emitted from the light emission center at an angle larger than that of the second light beam with respect to the optical axis, and the second light beam sequentially reflected by the total reflection part and the second inner surface.

A surface light source device according to an embodiment of the present invention includes: a plurality of the light emitting devices; and a light diffusion plate configured to allow light from the plurality of light emitting devices to pass through the light diffusion plate while diffusing the light.

A display device according to an embodiment of the present invention includes: the surface light source device;

and an irradiation member configured to be irradiated with light emitted from the surface light source device.

Advantageous Effects of Invention

According to the present invention, it is possible to provide a light emitting device that can expand light emitted from the light emitting element over a wide range while reducing the light travelling immediately upward in comparison with the conventional light emitting device. In addition, according to the present invention, it is possible to provide a surface light source device and a display device that less generate the bright spot in a region immediately above the light emitting device, and reduce luminance unevenness.

BRIEF DESCRIPTION OF DRAWINGS

FIGS. 5A to 5D illustrate a configuration of the light flux controlling member according to Embodiment 1;

FIG. 6A illustrates light paths of the surface light source device according to Embodiment 1, and FIG. 6B illustrates light paths of surface light source device according to comparative example 1;

FIGS. 14A to 14D illustrate a configuration of the light flux controlling member of the surface light source device according to Embodiment 2.

DESCRIPTION OF EMBODIMENTS

A surface light source device and a display device according to the present invention are described below with reference to the accompanying drawings. In the following description, as a typical example of the surface light source device according to the embodiments of the present invention, a surface light source device that includes light emitting devices disposed in a lattice and is suitable for a backlight of a liquid crystal display apparatus is described.

Embodiment 1

Configuration of Surface Light Source Device

Figure 1A:
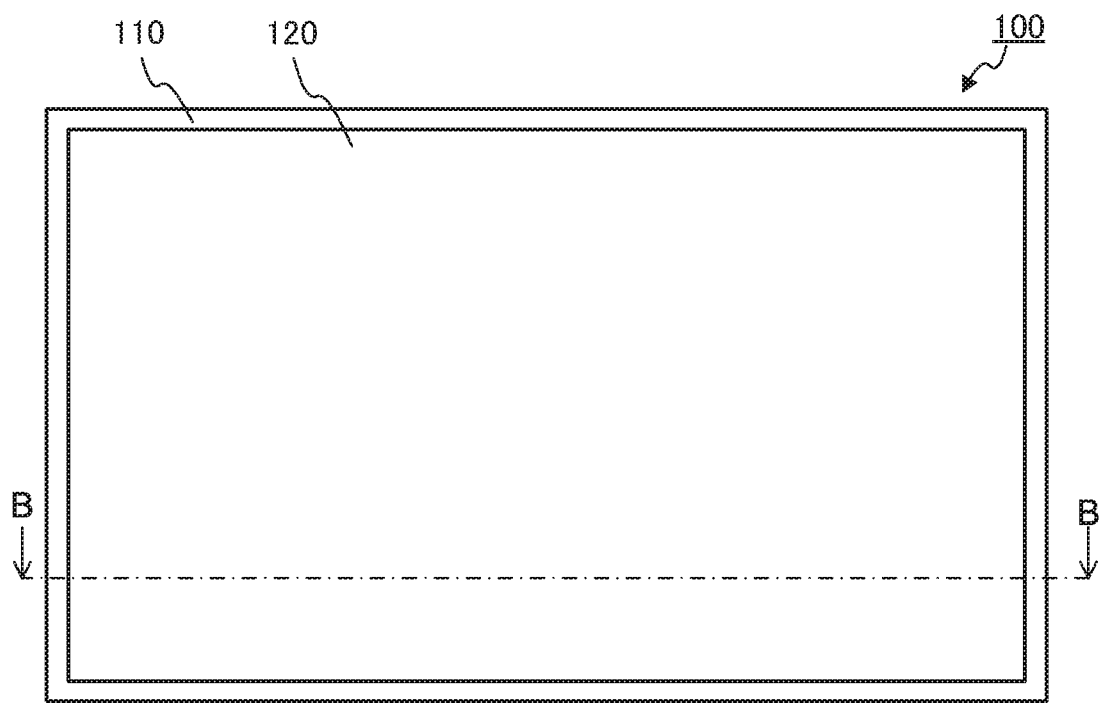
FIGS. 1A and 1B illustrate a configuration of a surface light source device according to Embodiment 1 of the present invention.
Figure 1B:
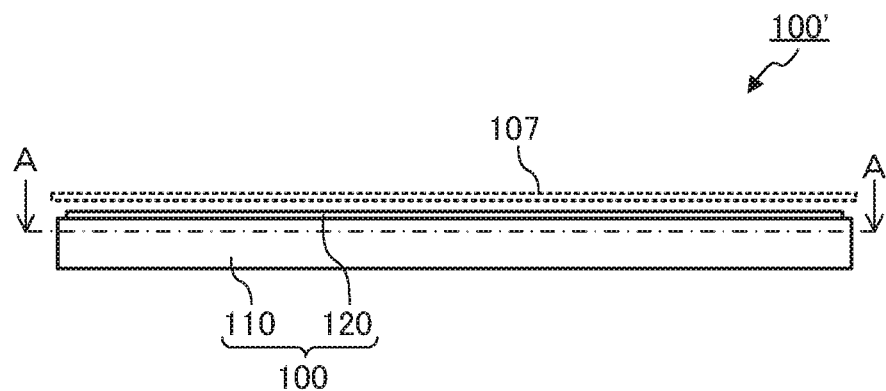
Figure 2A:
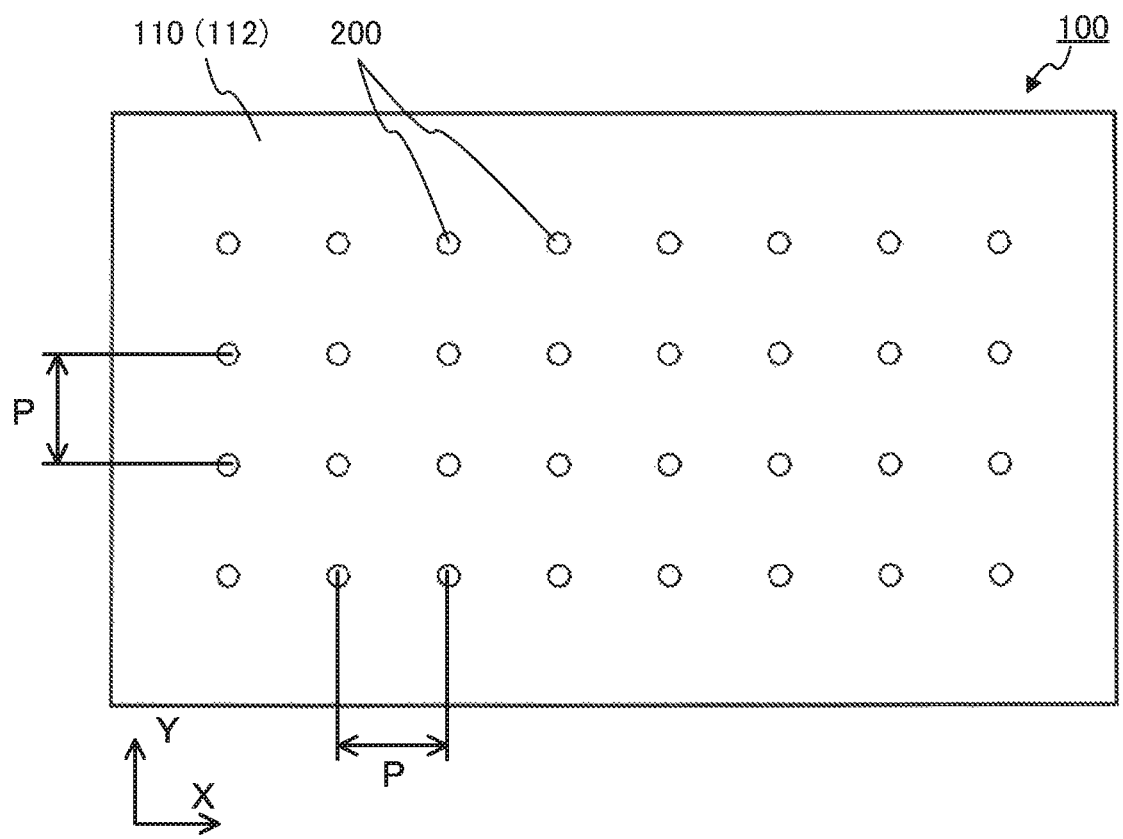
FIGS. 2A and 2B are sectional views of the surface light source device according to Embodiment 1.
Figure 2B:
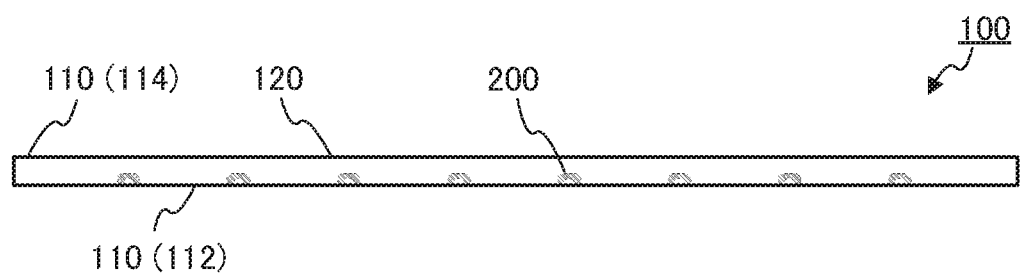
Figure 3:
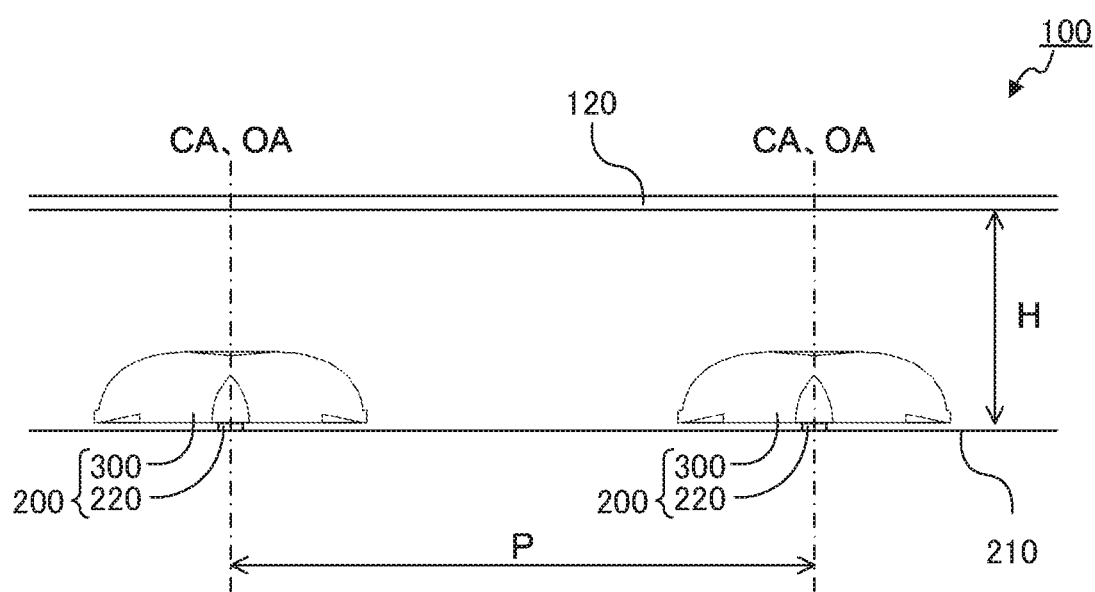
FIG. 3 is a partially enlarged sectional view of the surface light source device according to Embodiment 1.

FIGS. 1A to 3 illustrate a configuration of surface light source device 100 according to Embodiment 1 of the present invention. FIG. 1A is a plan view of surface light source device 100 according to Embodiment 1 of the present invention, and FIG. 1B is a front view of surface light source device 100. FIG. 2A is a sectional view taken along line A-A of FIG. 1B, and FIG. 2B is a sectional view taken along line B-B of FIG. 1A. FIG. 3 is a partially enlarged sectional view of surface light source device 100. Note that, in FIG. 3, a leg part of light flux controlling member 300 is omitted. In addition, in FIG. 3, the hatching of surface light source device 100 is omitted.

As illustrated in FIGS. 1A to 3, surface light source device 100 includes housing 110, a plurality of light emitting devices 200, and light diffusion plate (illuminated surface) 120. Surface light source device 100 of the embodiment of the present invention is applicable to a backlight of a liquid crystal display apparatus. In addition, as illustrated in FIG. 1B, surface light source device 100 can be used as display device 100' when combined with a display member (illumination member) 107 (indicated with dotted line in FIG. 1B) such as a liquid crystal panel.

The internal surface of bottom plate 112 of casing 110 functions as a diffusive reflection surface. Substrate 210 on which light emitting device 200 is disposed is disposed at a predetermined position on bottom plate 112. In addition, top plate 114 of casing 110 is provided with an opening. Light diffusion plate 120 is disposed to close the opening so as to function as a light emitting surface. The light emitting surface may have a size of, for example, approximately 400 mm×approximately 700 mm.

The plurality of light emitting devices 200 are arranged in a lattice on substrate 210 on bottom plate 112 of housing 110. The phrase "arranged in a lattice" means an arrangement in which each section of the lattice has a polygonal shape such as a rectangular shape and/or a triangular shape. Examples of sections of a lattice include a lattice with triangular sections (triangular lattice), a lattice with rectangular sections, a lattice with square sections (square lattice) and a lattice with polygonal sections. In the present embodiment, light emitting devices 200 are arranged in a square lattice. That is, in the present embodiment, light emitting devices 200 are disposed such that the center-to-center distance is P both in a first direction (the X direction in FIG. 2A) and in a second direction (the Y direction in FIG. 2A) orthogonal to the first direction.

In addition, the ratio of distance H between substrate 210 and light diffusion plate 120 to center-to-center distance P of light emitting devices 200 may be appropriately set. Preferably, the ratio of distance H between substrate 210 and light diffusion plate 120 to center-to-center distance P of light emitting devices 200 is 0.18 or smaller from the viewpoint of reducing the thickness of surface light source device 100. For example, distance H between substrate 210 and light diffusion plate 120 is 6 mm in the case where center-to-center distance P of light emitting devices 200 is 36 mm (H/P=0.17), and distance H between substrate 210 and light diffusion plate 120 is 8 mm in the case where center-to-center distance P of light emitting devices 200 is 44 mm (H/P=0.18), and, distance H between substrate 210 and light diffusion plate 120 is 10 mm in the case where center-to-center distance P of light emitting devices 200 is 60 mm (H/P=0.17).

Each light emitting device 200 includes light emitting element 220 and light flux controlling member 300. Light emitting element 220 is the light source of surface light source device 100, and is mounted on substrate 210. Light emitting element 220 is a light emitting diode (LED) such as a white light emitting diode, for example. Light emitting element 220 is disposed such that the light emission center thereof (optical axis OA) is located on central axis CA of light flux controlling member 300 (see FIG. 4). In addition, light emitting element 220 is disposed such that the light emission center (optical axis OA) thereof is aligned with the center of light emitting device 200 (see FIG. 3). Here, "optical axis OA of light emitting element" refers to a central light beam of a stereoscopic light flux from light emitting element 220. Light emitting elements 220 are arranged in a square lattice such that the center-to-center distance in the first direction (the X direction in FIG. 2A) and the center-to-center distance in the second direction orthogonal to the first direction (the Y direction in FIG. 2A) are equal to each other. That is, the center-to-center distance between each light emitting element is P in the first direction and in the second direction.

In addition, the position (height) of the light emitting surface of light emitting element 220 in the optical axis direction of light emitting element 220 may be appropriately set. The position (height) of the light emitting surface of light emitting element 220 in the optical axis direction of light emitting element 220 may be identical to the opening edge of recess 305 (see FIG. 4), or may be located on substrate 210 side relative to the opening edge, or, may be located on light diffusion plate 120 side relative to the opening edge. In the present embodiment, the light emitting surface of light emitting element 220 is disposed at a position (height) identical to the opening edge of recess 305 in the optical axis direction.

Light flux controlling member 300 is a lens, and is fixed on substrate 210. Light flux controlling member 300 controls the distribution of light emitted from light emitting element 220, and expands the light travelling direction in the plane direction of substrate 210. Light flux controlling member 300 is disposed over light emitting element 220 in such a manner that central axis CA thereof is aligned with optical axis OA of light emitting element 220 (see FIG. 3). Note that incidence surface 310 and light control surface 320 of light flux controlling member 300 described later are rotationally symmetrical (circularly symmetrical), and the rotation axis thereof is aligned with optical axis OA of light emitting element 220. The rotation axes of incidence surface 310 and light control surface 320 are referred to as "central axis CA of light flux controlling member."

Light flux controlling member 300 can be formed by integral molding. The material of light flux controlling member 300 may be appropriately selected from among materials through which light of a desired wavelength can pass. Examples of the material of light flux controlling member 100 include an optically transparent resin such as polymethylmethacrylate (PMMA), polycarbonate (PC), epoxy resin (EP), and silicone resin, and glass. Preferably, the refractive index of the material of light flux controlling member 300 is, but not limited to, 1.55 or greater from the viewpoint of providing a total reflection function to total reflection part 322 described later without increasing the size of light flux controlling member 300. Examples of the material whose refractive index is 1.55 or greater include transparent materials suitable for lens such as polycarbonate, thiourethane resin, and a nano composite material in which nano particles that provides a high refractive index function are dispersed in a base resin material. That is, preferably, light flux controlling member 300 is made of polycarbonate. A main feature of surface light source device 100 according to the present embodiment is the configuration of light flux controlling member 300. Therefore, the configuration that should be provided to light flux controlling member 300 is described later in detail.

Light diffusion plate 120 is a plate-shaped member having a light diffusing property, and allows the light emitted from light emitting device 200 to pass therethrough while diffusing the light. Light diffusion plate 120 is disposed over light emitting devices 200 approximately in parallel with substrate 210. Normally, the size of light diffusion plate 120 is substantially the same as that of the illumination member such as a liquid crystal panel. For example, light diffusion plate 120 is formed of an optically transparent resin such as polymethylmethacrylate (PMMA), polycarbonate (PC), polystyrene (PS), and styrene methyl methacrylate copolymerization resin (MS). In order to provide a light diffusing property, minute irregularities are formed on the surface of light diffusion plate 120, or diffusing members such as beads are dispersed in light diffusion plate 120.

In surface light source device 100 according to the embodiment of the present invention, the light emitted from each light emitting element 220 is controlled by light flux controlling member 300 so as to illuminate a predetermined illumination region of light diffusion plate 120. As described later, in light flux controlling member 300, the inner surface of light diffusion plate 120 is substantially uniformly illuminated to appropriately illuminate a predetermined irradiation region. The light reaching light diffusion plate 120 from each light flux controlling member 300 passes through light diffusion plate 120 while being diffused at light diffusion plate 120. Thus, surface light source device 100 according to the embodiment of the present invention can uniformly illuminate a planar illumination member (e.g., a liquid crystal panel).

Configuration of Light Flux Controlling Member

Figure 4:
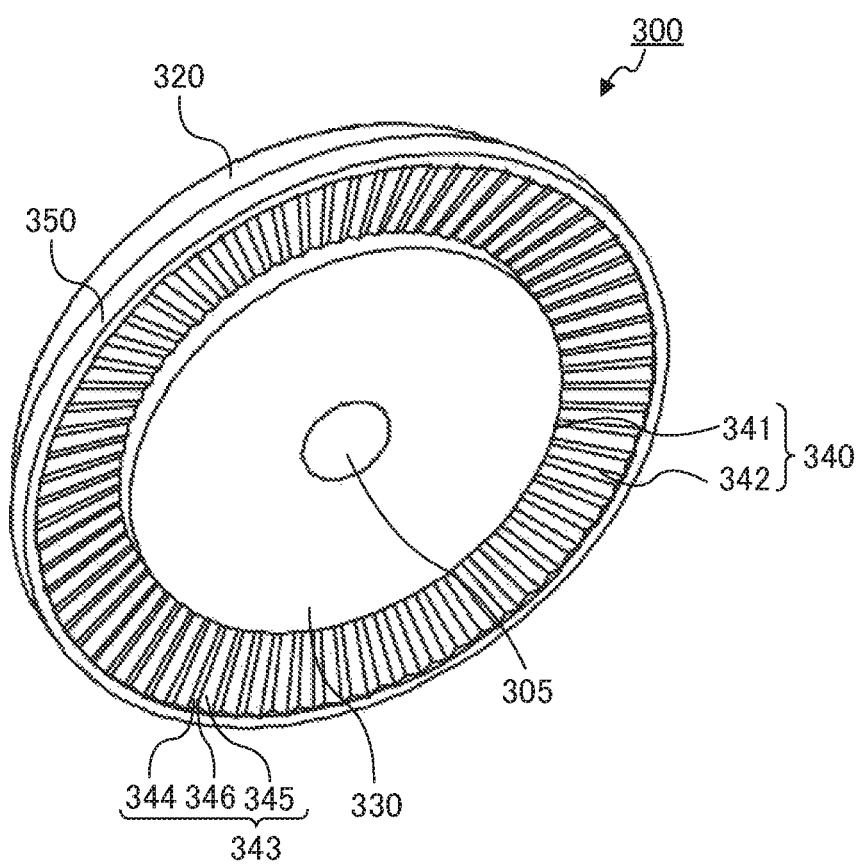
FIG. 4 is a perspective view of a light flux controlling member according to Embodiment 1 as viewed from a rear surface side.

FIG. 4 is a perspective view of light flux controlling member 300 according to Embodiment 1 of the present invention as viewed from the rear surface side. FIG. 5A is a plan view of light flux controlling member 300, FIG. 5B is a bottom view of light flux controlling member 300, FIG. 5C is a front view of light flux controlling member 300, and FIG. 5D is a sectional view taken along line A-A of FIG. 5A.

As illustrated in FIGS. 4 to 5D, light flux controlling member 300 includes incidence surface 310, light control surface 320, rear surface 330, and annular groove 340. In addition, light flux controlling member 300 includes flange part 350 configured to ease the handling of light flux controlling member 300, and a leg part (omitted in the drawing) configured to define a gap for dissipating heat from light emitting element 220 to the outside, and to position and fix light flux controlling member 300 to substrate 210.

Incidence surface 310 allows the majority of the light emitted from light emitting element 220 to enter light flux controlling member 300, while controlling the travelling direction of the light. Incidence surface 310 is an inner surface of recess 305 opening toward the rear side. Incidence surface 310 is disposed to intersect central axis CA (optical axis OA). Incidence surface 310 is rotationally symmetrical (in the present embodiment, circularly symmetrical) about central axis CA as the rotation axis. That is, recess 305 is disposed at a center portion of rear surface 330 to intersect central axis CA of light flux controlling member 300 (optical axis OA of light emitting element 220) (see FIG. 3).

Light control surface 320 is disposed on the front side of light flux controlling member 300 (light diffusion plate 120 side). Light control surface 320 emits, to the outside, a part of the light having entered light flux controlling member 300 while controlling the travelling direction thereof, and totally reflects, toward annular groove 340, another part of the light having entered light flux controlling member 300. Light control surface 320 intersects central axis CA, and is rotationally symmetrical (in the present embodiment, circularly symmetrical) about central axis CA as the rotation axis.

Light control surface 320 includes first transmission part 321, total reflection part 322, and second transmission part 323.

First transmission part 321 is disposed in a predetermined range around central axis CA so as to intersect central axis CA. First transmission part 321 allows a first light beam emitted from light emission center of light emitting element 220 at a small angle with respect to optical axis OA to pass therethrough while controlling the travelling direction of the first light beam. The shape of first transmission part 321 may be appropriately set as long as the above-described function can be ensured. The shape of first transmission part 321 is a planar surface, a curved surface protruding toward the rear side, or a curved surface protruding toward the front side. In the present embodiment, first transmission part 321 is a curved surface protruding toward the rear side. First transmission part 321 allows, to pass therethrough, the first light beam emitted at an angle of 0° to 14° from the light emission center of light emitting element 220, for example.

Total reflection part 322 is disposed continuously from first transmission part 321 to surround first transmission part 321. Total reflection part 322 totally reflects, toward second inner surface 342 of annular groove 340, at least a second light beam emitted from the light emission center of light emitting element 220 at an angle larger than that of the first light beam with respect to optical axis OA. Preferably, total reflection part 322 also totally reflects, toward second inner surface 342, the light emitted from a region other than the light emission center of light emitting element 220. However, the entirety of the light that is emitted from a region other than the light emission center of light emitting element 220 so as to reach total reflection part 322 need not necessarily be totally reflected toward second inner surface 342. Accordingly, a part of the light reaching total reflection part 322 may pass therethrough, or may be reflected toward a region other than second inner surface 342. The shape of total reflection part 322 is designed such that at least the light that is emitted from the light emission center of light emitting element 220 and reaches total reflection part 322 is totally reflected toward second inner surface 342. To be more specific, it suffices to design the shape of total reflection part 322 such that the light emitted from the light emission center of light emitting element 220 toward total reflection part 322 reaches total reflection part 322 at the critical angle or greater. In the present embodiment, total reflection part 322 is a smooth curved surface protruding toward the front side. The shape of total reflection part 322 is designed in consideration of the position of light emitting element 22, the shape of incidence surface 310, the material of light flux controlling member 300, and the like. When the refractive index of the material of light flux controlling member 300 is high as described above, it is possible to provide total reflection part 322 with a shape that can totally reflect the light emitted from the light emission center of light emitting element 220 toward second inner surface 342 without increasing the size of light flux controlling member 300. Total reflection part 322 totally reflects the second light beam emitted from the light emission center of light emitting element 220 at an angle greater than 14° and equal to or smaller than 46°, for example. In addition, in the present embodiment, the surface of total reflection part 322 is exposed to the outside of light flux controlling member 300. That is, in the present embodiment, a reflection member such as a reflection film is not formed on the surface of total reflection part 322.

Second transmission part 323 is disposed continuously from total reflection part 322 to surround total reflection part 322. Second transmission part 323 allows, to pass therethrough, a third light beam emitted from the light emission center of light emitting element 220 at an angle larger than that of the second light beam with respect to optical axis OA, and the second light beam sequentially reflected by total reflection part 322 and second inner surface 342 of annular groove 340. The shape of second transmission part 323 may be appropriately set as long as the above-described function can be ensured. In the present embodiment, second transmission part 323 is a smooth curved surface protruding toward the front side. Second transmission part 323 allows, to pass therethrough, a third light beam emitted from the light emission center of light emitting element 220 at an angle greater than 46°, for example.

Rear surface 330 is a surface disposed on the rear side to surround the opening edge of recess 305. The shape of rear surface 330 may be appropriately set. Rear surface 330 may be a surface perpendicular to central axis CA, an inclined surface inclined toward the rear side in the direction away from central axis CA, or an inclined surface inclined toward the front side in the direction away from central axis CA. In addition, rear surface 330 may be a smooth surface, or a roughened surface. In the present embodiment, rear surface 330 is a smooth surface perpendicular to central axis CA.

Annular groove 340 is formed on rear surface 330 to surround the opening edge of recess 305 (incidence surface 310). Annular groove 340 is rotationally symmetrical about central axis CA. Annular groove 340 includes first inner surface 341 disposed on central axis CA side, and second inner surface 342 disposed at a position farther from central axis CA than first inner surface 341. In addition, in the present embodiment, a plurality of ridges 343 are disposed on second inner surface 342 side, and the surfaces of ridges 343 are second inner surface 342.

First inner surface 341 may be parallel to central axis CA, or may be inclined toward the front side in the direction away from central axis CA. In the present embodiment, first inner surface 341 is parallel to central axis CA.

Second inner surface 342 is formed on the rear side of light flux controlling member 300 to surround first inner surface 341. Second inner surface 342 is inclined toward the rear side in the direction away from central axis CA.

The position of annular groove 340 in rear surface 330 is not limited as long as at least a part of the second light beam totally reflected by total reflection part 322 reaches second inner surface 342 so as to be reflected toward second transmission part 323. Preferably, annular groove 340 is disposed in a region where the majority of the second light beam totally reflected by total reflection part 322 reaches.

Second inner surface 342 (ridges 343) internally reflects, toward second transmission part 323, a light beam totally reflected by total reflection part 322. Second inner surface 342 (ridges 343) is inclined toward the rear side in the direction away from central axis CA. In addition, each ridge 343 includes first inclined surface 344, second inclined surface 345, and ridgeline 346 disposed between first inclined surface 344 and second inclined surface 345. Ridgeline 346 is inclined toward the rear surface side in the direction away from central axis CA. The cross-sectional shape of ridge 343 perpendicular to ridgeline 346 may be a triangular shape, a triangular shape with a chamfered apex, a semicircular shape, a trapezoidal shape with another surface between first inclined surface 344 and second inclined surface 345, and the like. In the present embodiment, the cross-sectional shape of ridge 343 perpendicular to ridgeline 346 is a triangular shape. That is, in the present embodiment, first inclined surface 344 and the second inclined surface are connected with ridgeline 346 therebetween. Each ridge 343 functions as a total reflection prism. That is, the second light beam totally reflected by total reflection part 322 is sequentially reflected by first inclined surface 344 and second inclined surface 345 toward second transmission part 323. Ridges 343 are disposed so as to be rotationally symmetrical about central axis CA (n-fold rotational symmetry, where n represents the number of ridges 343).

A simulation about light paths performed with surface light source device 100 is described below. FIG. 6A illustrates a simulation result of light paths in a cross section including central axis CA of surface light source device 100 according to the present embodiment, and FIG. 6B illustrates a simulation result of light paths in a cross section including central axis CA of surface light source device 500 according to comparative example 1. FIGS. 6A and 6B illustrate light beams emitted from the light emission center of light emitting element 220 at respective angles differing by 2° in an angle range of 0 to 80° with respect to optical axis OA. Distance H between substrate 210 and light diffusion plate 120 is 10 mm. In addition, surface light source device 500 according to comparative example 1 is different from light flux controlling member 300 according to the present embodiment only in configuration of light flux controlling member 600. To be more specific, light flux controlling member 600 of surface light source device 500 according to comparative example 1 includes, in place of total reflection part 322, transmission part 642 configured to allow the second light beam to pass therethrough toward outside. In addition, in FIGS. 6A and 6B, the hatching of surface light source devices 100 and 500 is omitted to illustrate the light paths.

From comparison between FIGS. 6A and 6B, it is understood that surface light source device 100 according to the present embodiment generates less light travelling toward the area immediately above light emitting device 200 in comparison with surface light source device 500 according to comparative example 1. That is, no bright spot is generated in the area immediately above light emitting device 200. In addition, in surface light source device 100 according to the present embodiment, the light emitted from the light emission center of light emitting element 220 reaches a position farther from central axis CA of light emitting device 200 (light flux controlling member 300) than in surface light source device 500 according to comparative example 1.

Next, a simulation about the relationship between the emission angle of the light beam and the arrival position of the light beam at light diffusion plate 120 is described below. Also, a similar simulation was performed with surface light source devices 500 and 700 according to comparative examples 1 and 2. Surface light source device 700 according to comparative example 2 is different from light flux controlling member 300 according to the present invention only in configuration of light flux controlling member 800. To be more specific, in light flux controlling member 800 of surface light source device 700 according to comparative example 2, no annular groove 340 is provided and rear surface 330 is roughened by knurling.

Figure 7A:
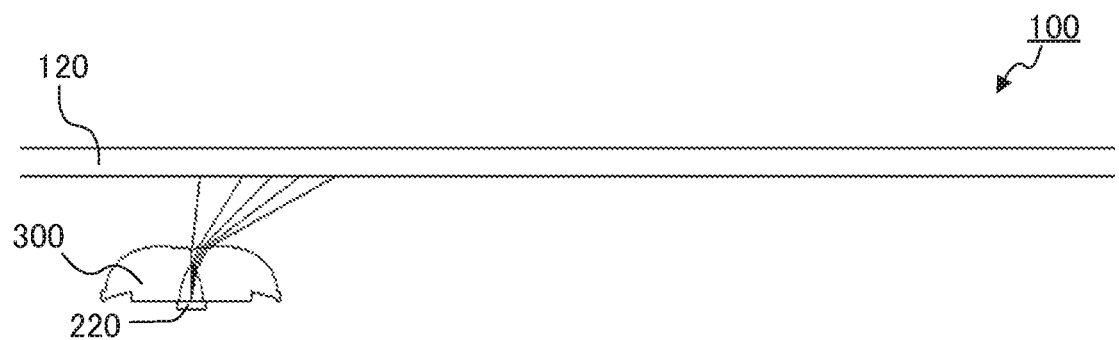
FIGS. 7A to 7D illustrate light paths of the surface light source device according to Embodiment 1.
Figure 7B:
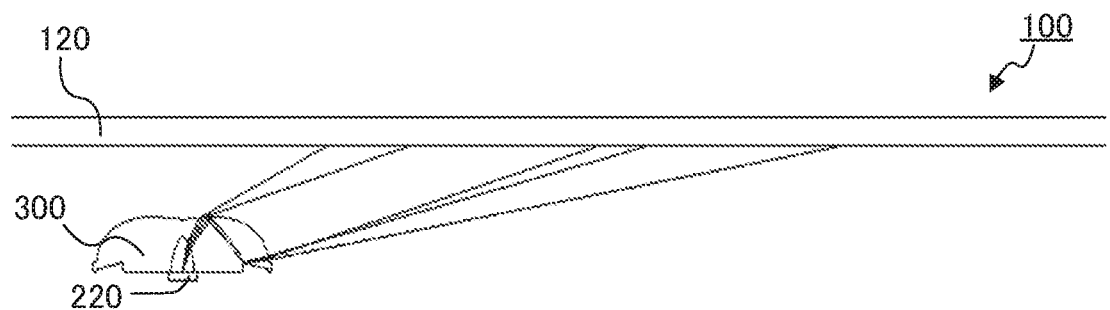
Figure 7C:
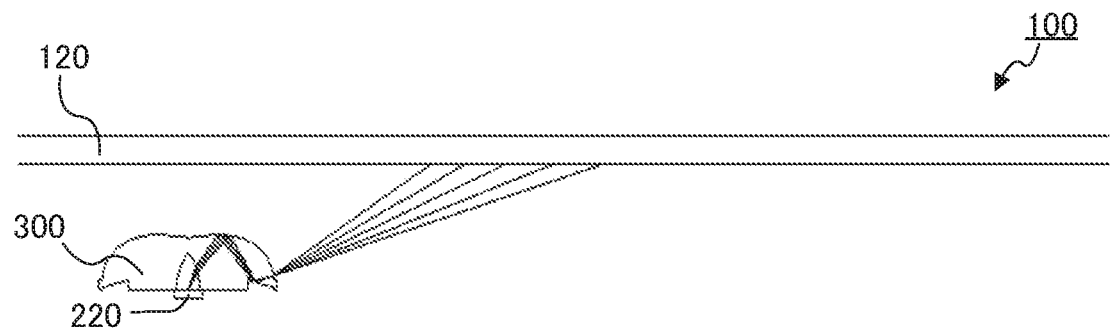
Figure 7D:
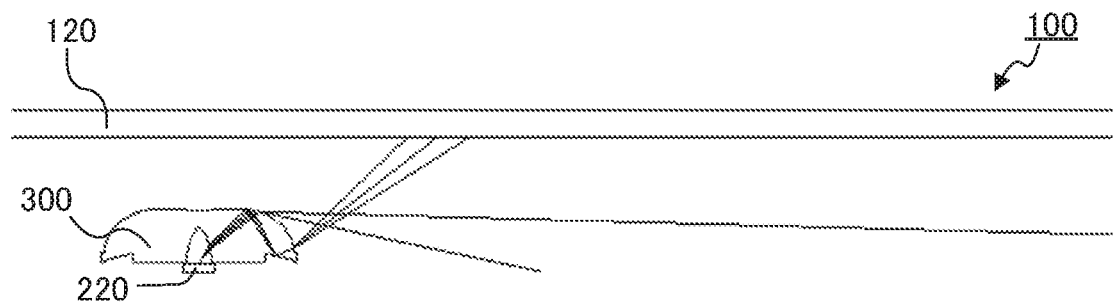
Figure 8A:
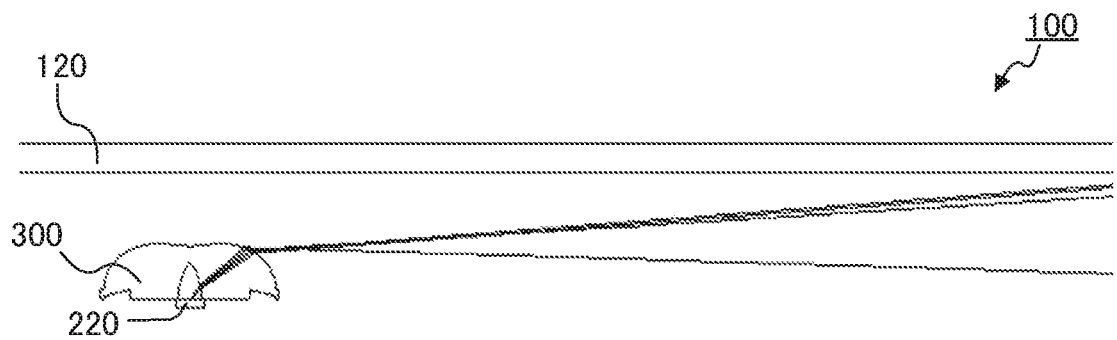
FIGS. 8A to 8D illustrate light paths of the surface light source device according to Embodiment 1.
Figure 8B:
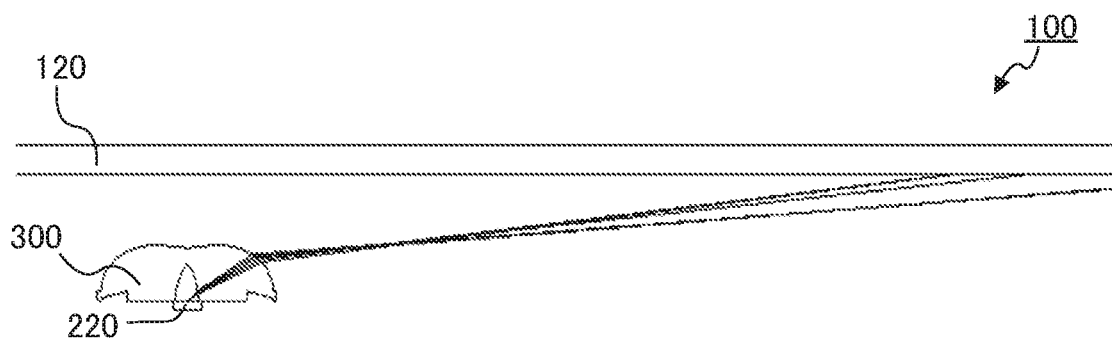
Figure 8C:
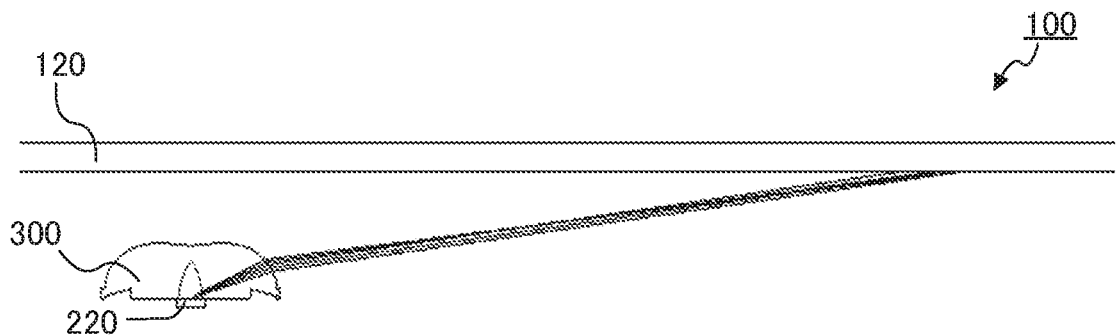
Figure 8D:
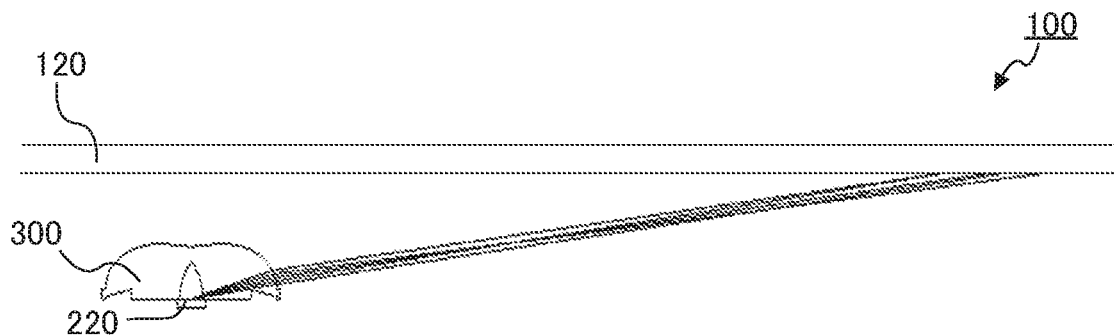
Figure 9A:
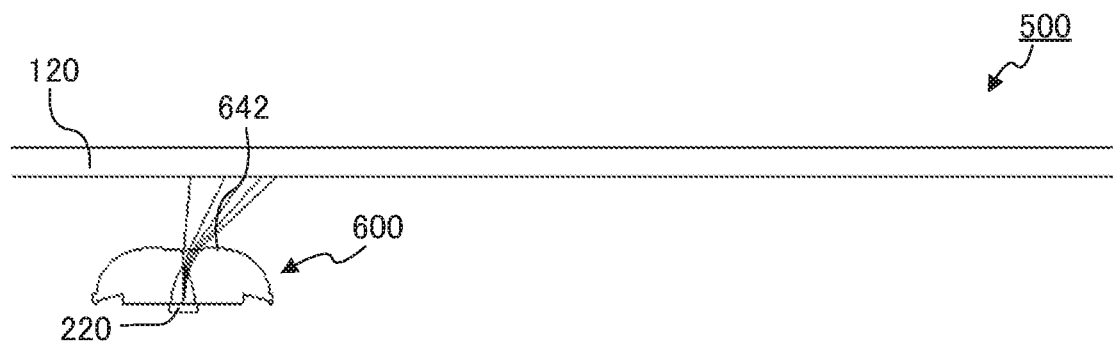
FIGS. 9A to 9D illustrate light paths of the surface light source device according to comparative example 1.
Figure 9B:
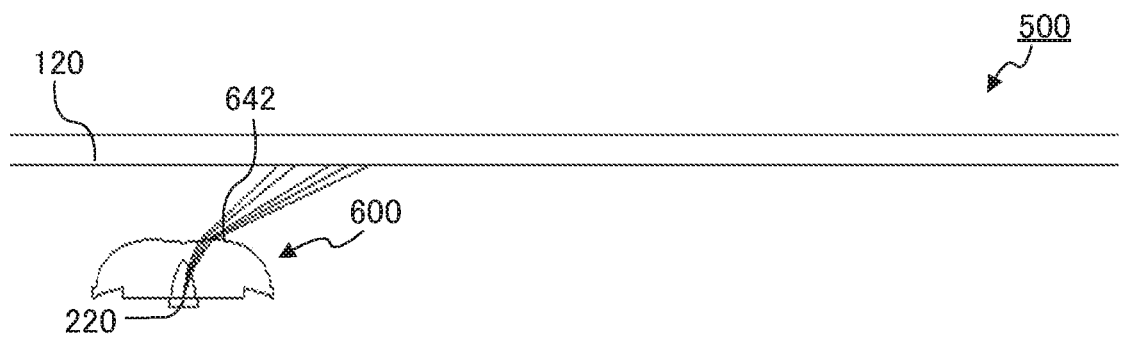
Figure 9C:
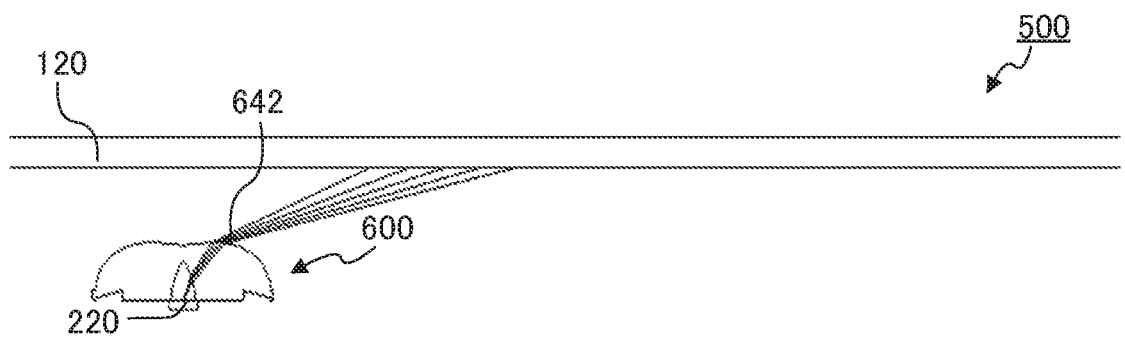
Figure 9D:
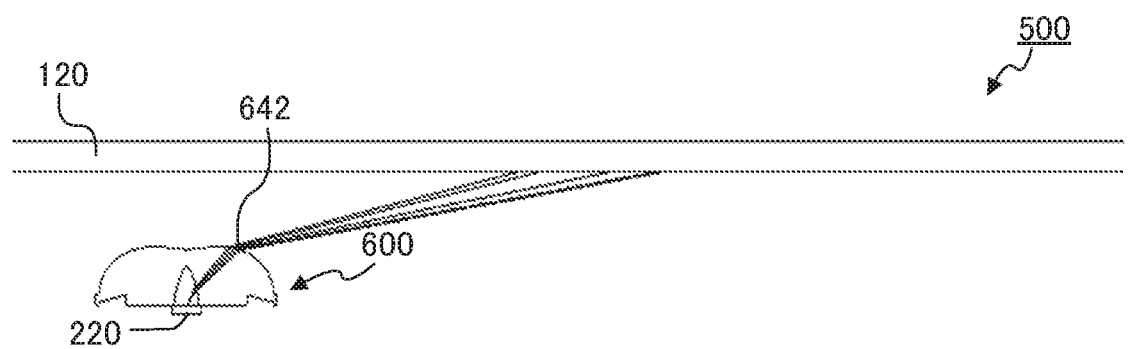
Figure 10A:
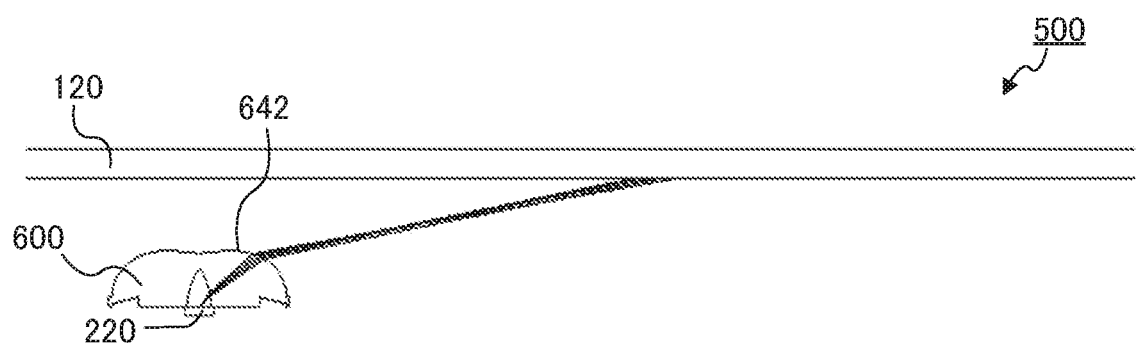
FIGS. 10A to 10D illustrate light paths of the surface light source device according to comparative example 1.
Figure 10B:
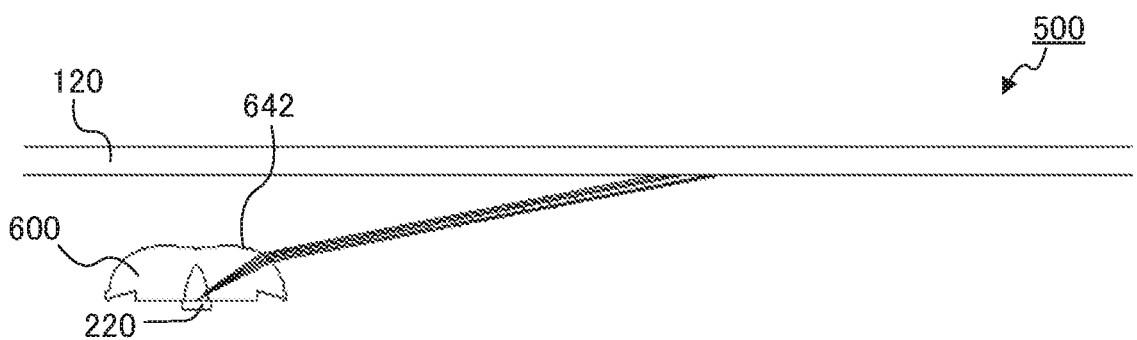
Figure 10C:
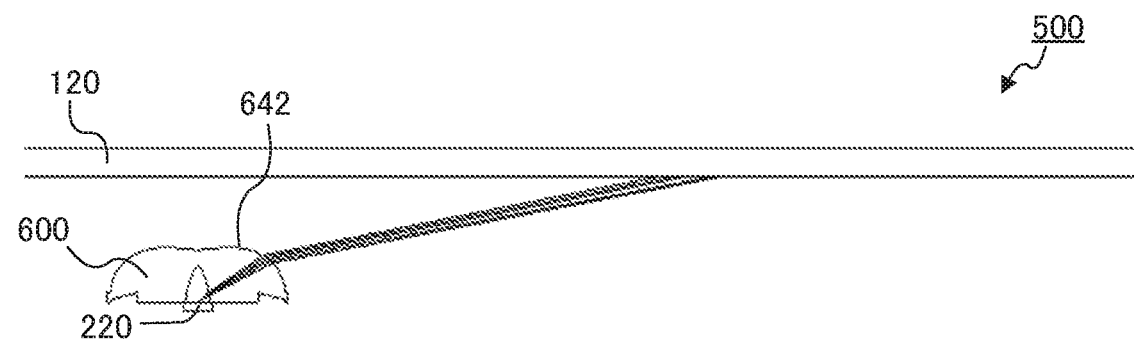
Figure 10D:
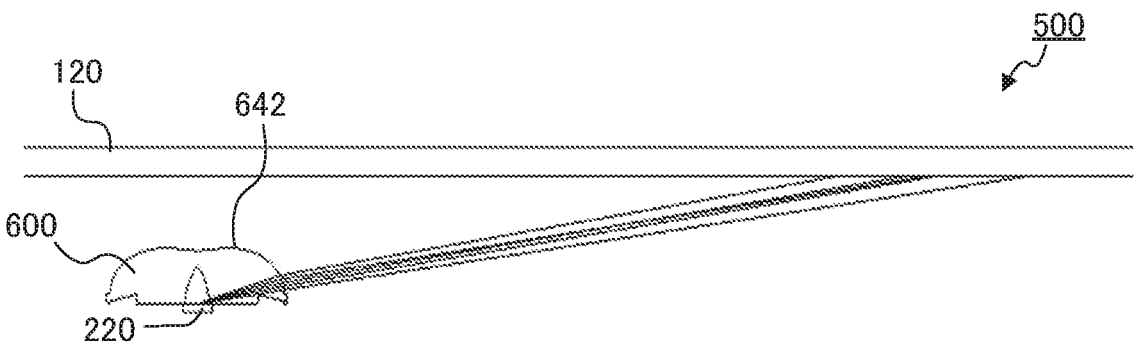
Figure 11A:
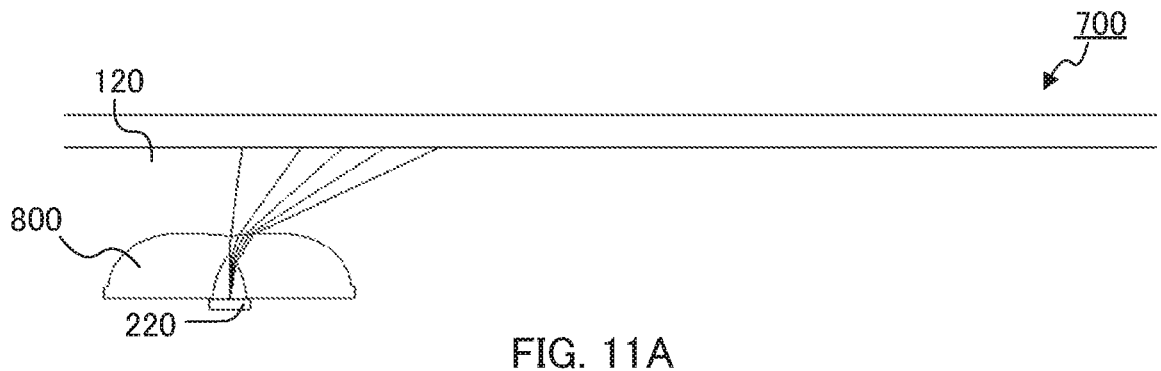
FIGS. 11A to 11D illustrate light paths of a surface light source device according to comparative example 2.
Figure 11B:
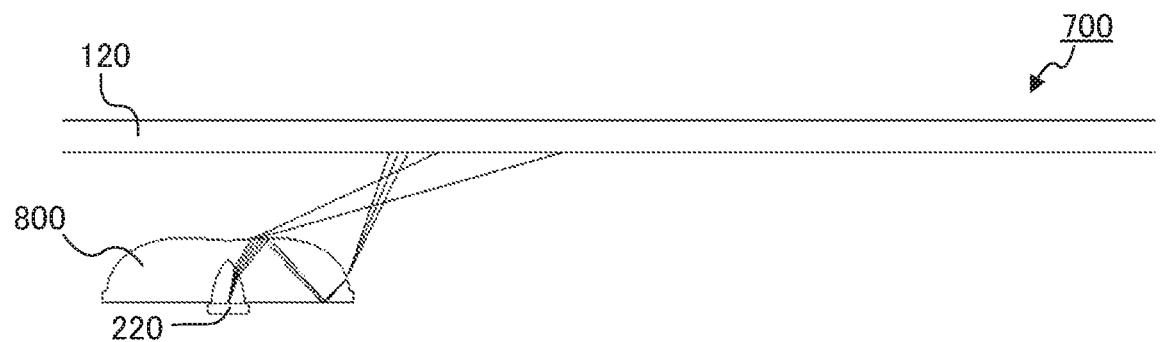
Figure 11C:
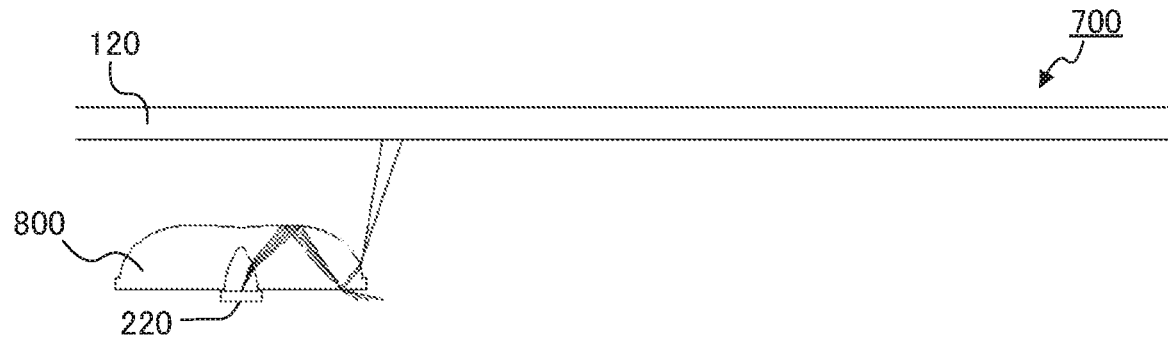
Figure 11D:
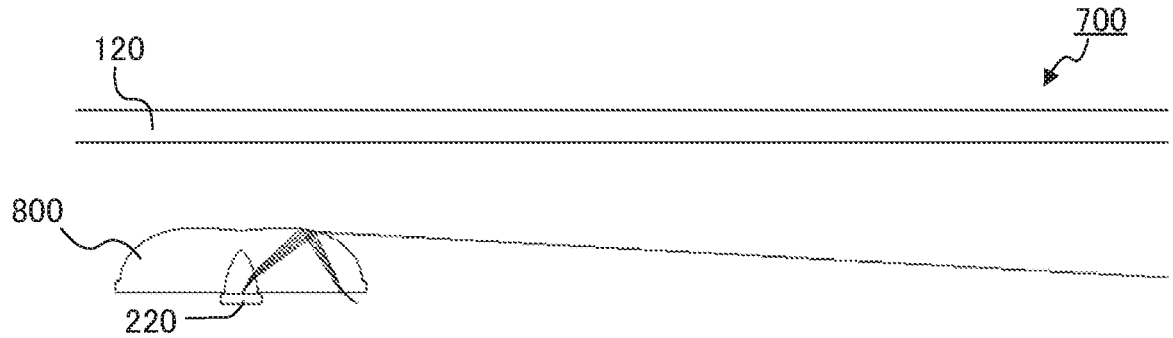

FIGS. 7A to 8D illustrate a simulation result of light paths in a cross section including central axis CA of surface light source device 100 according to the present invention, and FIGS. 9A to 10D illustrate a simulation result of light paths in a cross section including central axis CA of surface light source device 500 according to comparative example 1. FIGS. 11A to 11D illustrate a simulation result of light paths in a cross section including central axis CA of surface light source device 700 according to comparative example 2. FIGS. 7A, 9A and 11A illustrate light paths of an emission angle range of 2 to 10°, FIGS. 7B, 9B and 11B illustrate light paths of an emission angle range of 10 to 20°, FIGS. 7C, 9C and 11C illustrate light paths of an emission angle range of 20 to 30°, and FIGS. 7D, 9D and 11C illustrate light paths of an emission angle range of 30 to 40°. FIGS. 8A and 10A illustrate light paths of an emission angle range of 40 to 50°, FIGS. 8B and 10B illustrate light paths of an emission angle range of 50 to 60°, FIGS. 8C and 10C illustrate light paths of an emission angle range of 60 to 70°, and FIGS. 8D and 10D illustrate light paths of an emission angle range of 70 to 80°. In addition, in FIGS. 7A to 11D, the hatching of surface light source devices 100, 500 and 700 is omitted to illustrate the light paths.

As illustrated in FIG. 7A and FIG. 7B, in surface light source device 100 according to the present embodiment, the first light beam emitted at a small emission angle from the light emission center of light emitting element 220 is entered from incidence surface 310, and controlled by first transmission part 321 to travel in a direction away from central axis CA, and then, emitted out of light flux controlling member 300. Then, the light emitted from light flux controlling member 300 reaches diffusion plate 120 at a position relatively close to central axis CA.

As illustrated in FIGS. 7B to 7D, the second light beam emitted from the light emission center of light emitting element 220 at an angle larger than that of the first light beam is entered from incidence surface 310, and then reaches total reflection part 322. The second light beam is totally reflected by total reflection part 322 toward annular groove 340, and then further sequentially internally reflected by first inclined surface 344 and second inclined surface 345 so as to be emitted from second transmission part 323. At this time, the second light beam reaches light diffusion plate 120 in a wider range than in surface light source device 500 according to comparative example 1 described later.

As illustrated in FIGS. 8A to 8D, the third light beam emitted from the light emission center of light emitting element 220 at an angle larger than that of the second light beam is entered from incidence surface 310, and controlled by second transmission part 323 to travel in a direction away from central axis CA, and then, emitted out of light flux controlling member 300. Then, the light emitted from light flux controlling member 300 reaches light diffusion plate 120 at a position remote from central axis CA.

On the other hand, as illustrated in FIGS. 9A to 10D, in surface light source device 500 according to comparative example 1, the first light beam is entered from incidence surface 310, and controlled by first transmission part 321 to travel in a direction away from central axis CA, and then, emitted out of light flux controlling member 600. The second light beam is controlled by the transmission part to further travel in a direction away from central axis CA, and is emitted out of light flux controlling member 600. The third light beam is controlled by second transmission part 642 to further travel in a direction away from central axis CA, and is then emitted out of light flux controlling member 600. In this manner, in surface light source device 500 according to comparative example 1, the arrival position of the light emitted from light emitting element 220 becomes farther from the central axis as the light emission angle increases.

In addition, as illustrated in FIGS. 11A to 11D, in surface light source device 700 according to comparative example 2, the first light beam is entered from incidence surface 310, and controlled by first transmission part 321 to travel in a direction away from central axis CA, and then, emitted out of light flux controlling member 800. The second light beam is totally reflected by total reflection part 322 toward rear surface 330. A part of the second light beam having reached rear surface 330 is internally reflected by rear surface 330 and is emitted upward of light flux controlling member 800 from second transmission part 323. Note that, although not illustrated in the drawings, the third light beam is controlled by second transmission part 323 so as to further travel in a direction away from central axis CA, and is then emitted out of light flux controlling member 800. In this manner, in surface light source device 700 according to comparative example 2, a part of the light beam totally reflected by total reflection part 322 travels toward the portion immediately above it since annular groove 340 is not provided.

Next, a simulation about the luminance distribution at light diffusion plate 120 in surface light source device 100 is described below. In addition, for comparison, the simulation was performed also with surface light source device 500 according to comparative example 1. In this simulation, the luminance distribution was examined regarding direct emission light that is emitted from the light emission center of light emitting element 220 and is emitted from the light control surfaces of light flux controlling members 300 and 600, scattering light other than the direct emission light, and whole light that is a combination of the direct emission light and the scattering light.

Figure 12A:
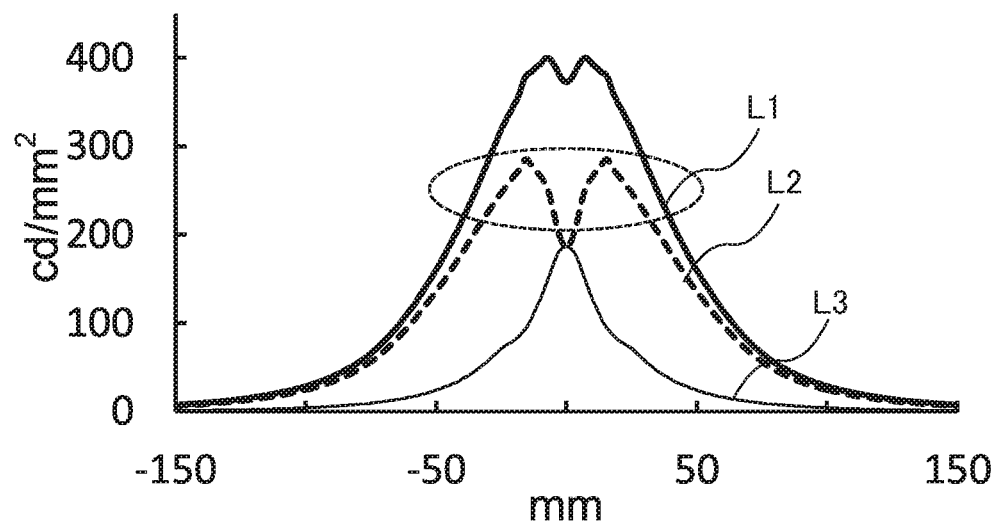
FIGS. 12A and 12B are graphs illustrating a luminance distribution in the surface light source device.
Figure 12B:
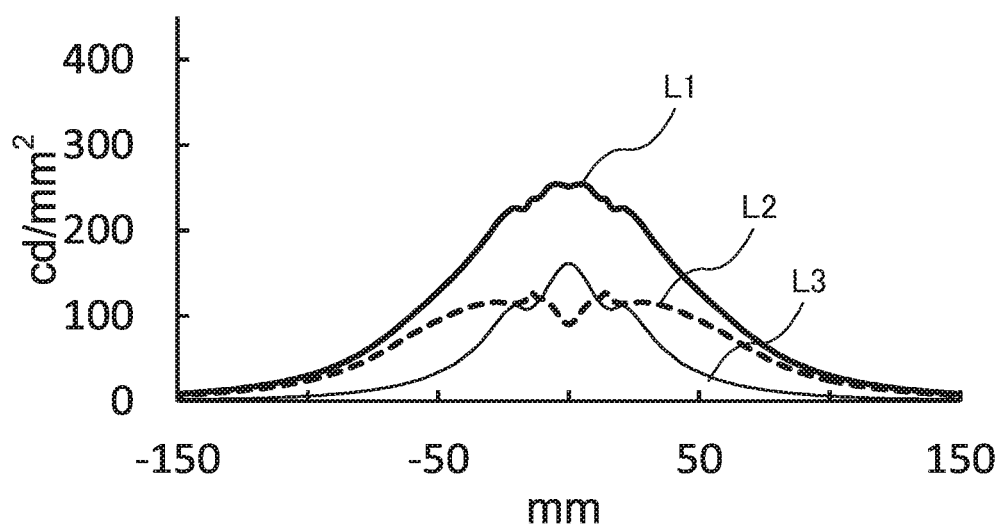

FIG. 12A is a graph illustrating a luminance distribution in surface light source device 500 according to comparative example 1, and FIG. 12B is a graph illustrating a luminance distribution in surface light source device 100 according to the present embodiment. In FIGS. 12A and 12B, the abscissa indicates the distance from central axis CA, and the ordinate indicates the luminance. L1 indicates the result of the whole light, L2 the result of the direct emission light, and L3 the result of the scattering light.

As described above, in surface light source device 500 according to comparative example 1, the majority of the light from light emitting element 220 that is entered from incidence surface 310 is emitted out of light flux controlling member 600 from the light control surface (see FIG. 6B). In light flux controlling member 600, even when the light in a region around optical axis OA is expanded in order to reduce the luminance at a portion immediately above light emitting element 220, the expanded light beam does not reach a remote place, thus forming a ring-shaped bright spot in a region around the optical axis OA. As a dotted line indicates in FIG. 12A, in surface light source device 500 according to comparative example 1 (in comparative example 1, distance H between substrate 210 and light diffusion plate 120 is 10 mm), the luminance is high in a region approximately 15 mm from optical axis OA of light emitting device. On the other hand, in surface light source device 100 according to the present embodiment, the luminance on the surface light source device (the luminance at approximately 15 mm from optical axis OA) with direct emission light is lower than in surface light source device 500 according to comparative example 1. The reason for this is that in light source device 100 according to the present embodiment in which light flux controlling member 300 is provided with total reflection part 322, light travels upward of light emitting device 200 and light that reaches a region approximately 15 mm from optical axis OA is reduced (see FIG. 6A).

As described above, in the case where H is 10 mm, a bright spot is generated with light beams that reach a region at approximately 15 mm from optical axis OA, but when distance H between substrate 210 and light diffusion plate 120 increases, the illuminated surface becomes father and the irradiation range expands, and thus the bright spot becomes less noticeable. The present invention is effective for a case where, even when light is expanded as much as possible by refraction at the light control surface, the expanded light concentrates at a specific position and generates a bright spot on the light diffusion plate because of a small distance H between substrate 210 and light diffusion plate 120. That is, in the present invention, generation of the bright spot is suppressed by totally reflecting the light that tends to concentrate at a specific position at the light control surface so as to return the light to the second inner surface of the annular groove formed in the rear surface of light flux controlling member, and then by again reflecting the light at the second inner surface such that the light does not concentrate at the specific position on the light diffusion plate.

Effect

As described above, in light emitting device 200 according to the present embodiment, the second light beam is totally reflected by total reflection part 322 without passing through total reflection part 322. Thereafter, the second light beam is further internally reflected by second inner surface 342 of annular groove 340 and is then emitted out of second transmission part 323. In this manner, in comparison with the conventional light emitting device, light emitting device 200 according to the present embodiment can control a light beam that tends to be emitted upward of light emitting device 200 to travel in the lateral direction. Thus, generation of a bright spot at a portion immediately above the light emitting device can be reduced and the light beam can be delivered over a wide range. Accordingly, by applying light emitting device 200 according to the present embodiment to surface light source device 100, the thickness of surface light source device 100 can be reduced, and the number of light emitting devices 200 can be reduced.

Embodiment 2

Configuration of Surface Light Source Device

The surface light source device according to Embodiment 2 is different from surface light source device 100 of Embodiment 1 only in configuration of light flux controlling member 400. In view of this, only light flux controlling member 400 is described below. In addition, the components similar to the components of light flux controlling member 300 of Embodiment 1 are denoted with similar reference numerals, and the description thereof will be omitted.

Figure 13:
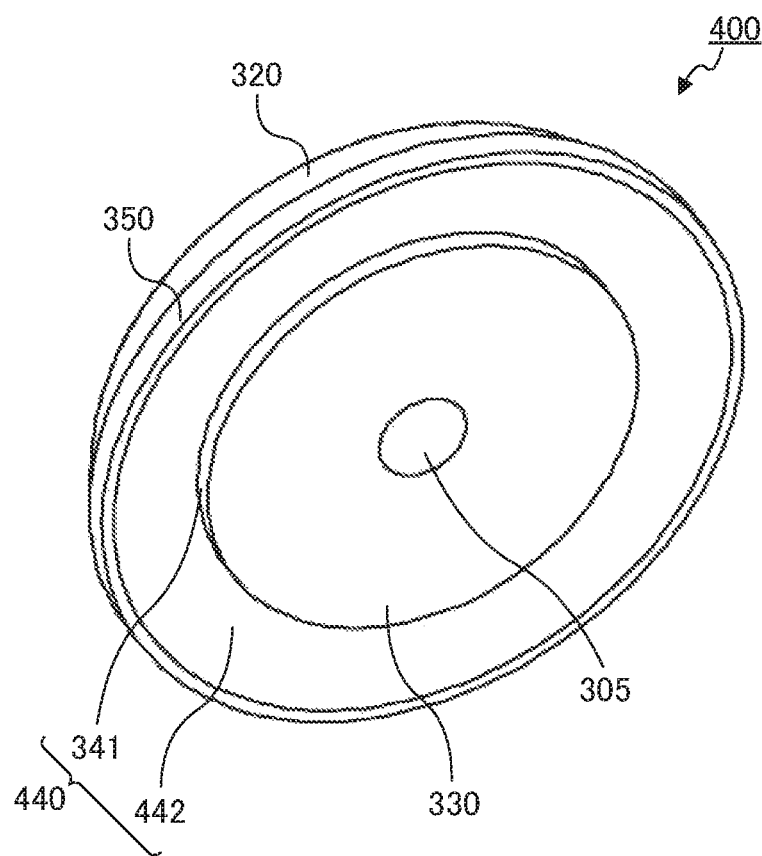
FIG. 13 is a perspective view of a light flux controlling member of a surface light source device according to Embodiment 2 of the present invention as viewed from a rear surface side.

FIG. 13 is a perspective view of light flux controlling member 400 of a surface light source device according to Embodiment 2 of the present invention as viewed from a rear surface side. FIG. 14A is a plan view of light flux controlling member 400, FIG. 14B is a bottom view of light flux controlling member 400, FIG. 14C is a front view of light flux controlling member 400, and FIG. 14D is a sectional view taken along line A-A of FIG. 14A.

Light flux controlling member 400 of the surface light source device according to Embodiment 2 includes incidence surface 310, light control surface 320, rear surface 330, and annular groove 440. Annular groove 440 includes first inner surface 341 and second inner surface 442. Second inner surface 442 is not provided with a plurality of ridges 343. That is, in the present embodiment, second inner surface 442 is formed in a shape of a side surface of a truncated conical shape.

In addition, although not illustrated in the drawings, the light path diagram of the surface light source device according to Embodiment 2 was substantially the same as that of the surface light source device 100 according to Embodiment 1.

Effect

The surface light source device according to Embodiment 2 provides an effect similar to that of Embodiment 1.

This application is entitled to and claims the benefit of Japanese Patent Application No. 2017-034740 filed on Feb. 27, 2017, the disclosure each of which including the specification, drawings and abstract is incorporated herein by reference in its entirety.

INDUSTRIAL APPLICABILITY

The light-emitting device and the surface light source device according to the embodiments of the present invention are applicable to a backlight of a liquid crystal display apparatus, a commonly-used illumination device and the like, for example.

REFERENCE SIGNS LIST 100, 500, 700 Surface light source device
100' Display device
107 Illumination surface
110 Housing
112 Bottom plate
114 Top plate
120 Light diffusion plate
200 Light emitting device
210 Substrate
220 Light emitting element
300, 400, 600, 800 Light flux controlling member
305 Recess
310 Incidence surface
320 Light control surface
321 First transmission part
322 Total reflection part
323 Second transmission part
330 Rear surface
340, 440 Annular groove
341 First inner surface
342, 442 Second inner surface
343 Ridge
344 First inclined surface
345 Second inclined surface
346 Ridgeline
350 Flange part
CA Central axis of light flux controlling member
OA Optical axis of light emitting element

What is claimed is:

1. A light emitting device comprising a light emitting element and a light flux controlling member configured to control a distribution of light emitted from the light emitting element,
wherein an optical axis of the light emitting element and a central axis of the light flux controlling member are aligned with each other;
wherein the light flux controlling member includes:
an incidence surface that is an inner surface of a recess disposed to intersect the central axis and to open toward a rear side, the incidence surface being configured to allow incidence of the light emitted from the light emitting element;
a light control surface disposed on a front side to intersect the central axis, the light control surface being configured to control a distribution of light entered from the incidence surface;
a rear surface disposed on the rear side to surround an opening edge of the recess; and
an annular groove formed in a circular shape in the rear surface to surround the opening edge of the recess;
wherein the annular groove includes:
a first inner surface disposed on a central axis side; and
a second inner surface disposed at a position farther from the central axis than the first inner surface; and
wherein the light control surface includes:
a first transmission part disposed to intersect the central axis, and configured to allow, to pass through the first transmission part, a first light beam emitted from a light emission center of the light emitting element;
a total reflection part disposed continuously from the first transmission part to surround the first transmission part, the total reflection part being configured to totally reflect a second light beam toward the second inner surface, the second light beam being a light beam emitted from the light emission center at an angle larger than that of the first light beam with respect to the optical axis; and
a second transmission part disposed continuously from the total reflection part to surround the total reflection part, the second transmission part being configured to allow, to pass through the second transmission part, a third light beam emitted from the light emission center at an angle larger than that of the second light beam with respect to the optical axis, and the second light beam sequentially reflected by the total reflection part and the second inner surface.

2. The light emitting device according to claim 1, wherein in the second inner surface, a plurality of ridges are disposed, each of the plurality of ridges including a first inclined surface, a second inclined surface, and a ridgeline disposed between the first inclined surface and the second inclined surface, the plurality of ridges being disposed such that the plurality of ridges are rotationally symmetrical about the central axis, the ridgeline being inclined toward the rear side in a direction away from the central axis; and
wherein the second light beam totally reflected by the total reflection part is emitted out of the light flux controlling member from the second transmission part after being sequentially reflected by the first inclined surface and the second inclined surface.

3. The light emitting device according to claim 2, wherein a material of the light flux controlling member has a refractive index of 1.55 or greater.

4. The light emitting device according to claim 3, wherein the light flux controlling member is made of polycarbonate.

5. A surface light source device comprising:
a plurality of the light emitting devices according to claim 4; and a light diffusion plate configured to allow light from the plurality of light emitting devices to pass through the light diffusion plate while diffusing the light.

6. A surface light source device comprising:
a plurality of the light emitting devices according to claim 3; and
a light diffusion plate configured to allow light from the plurality of light emitting devices to pass through the light diffusion plate while diffusing the light.

7. A surface light source device comprising:
a plurality of the light emitting devices according to claim 2; and
a light diffusion plate configured to allow light from the plurality of light emitting devices to pass through the light diffusion plate while diffusing the light.

8. The light emitting device according to claim 1, wherein a material of the light flux controlling member has a refractive index of 1.55 or greater.

9. The light emitting device according to claim 8, wherein the light flux controlling member is made of polycarbonate.

10. A surface light source device comprising:
a plurality of the light emitting devices according to claim 9; and
a light diffusion plate configured to allow light from the plurality of light emitting devices to pass through the light diffusion plate while diffusing the light.

11. A surface light source device comprising:
a plurality of the light emitting devices according to claim 8; and
a light diffusion plate configured to allow light from the plurality of light emitting devices to pass through the light diffusion plate while diffusing the light.

12. A surface light source device comprising:
a plurality of the light emitting devices according to claim 1; and
a light diffusion plate configured to allow light from the plurality of light emitting devices to pass through the light diffusion plate while diffusing the light.

13. A display device comprising:
the surface light source device according to claim 12; and
an irradiation member configured to be irradiated with light emitted from the surface light source device.

* * * * *